(12) United States Patent
Tarao et al.

(10) Patent No.: US 8,563,639 B2
(45) Date of Patent: *Oct. 22, 2013

(54) CURING TYPE POLYURETHANE AQUEOUS GOLF BALL PAINT AND PAINTED GOLF BALL USING THE SAME

(75) Inventors: Toshiyuki Tarao, Kobe (JP); Kuniyasu Horiuchi, Kobe (JP); Hirokazu Okamoto, Amagasaki (JP); Masahiko Shiraishi, Amagasaki (JP)

(73) Assignees: SRI Sports Limited, Kobe (JP); Shinto Paint Co., Ltd., Hyogo (JP)

( * ) Notice: Subject to any disclaimer, the term of this patent is extended or adjusted under 35 U.S.C. 154(b) by 327 days.

This patent is subject to a terminal disclaimer.

(21) Appl. No.: 12/909,890

(22) Filed: Oct. 22, 2010

(65) Prior Publication Data

US 2011/0105247 A1    May 5, 2011

(30) Foreign Application Priority Data

Oct. 30, 2009 (JP) ................................. 2009-251329

(51) Int. Cl.
- *A63B 37/00* (2006.01)
- *C09D 175/04* (2006.01)
- *C09D 133/14* (2006.01)

(52) U.S. Cl.
USPC ........... 524/317; 524/501; 524/507; 525/123; 525/127; 525/458; 473/351; 473/371

(58) Field of Classification Search
None
See application file for complete search history.

(56) References Cited

U.S. PATENT DOCUMENTS

| | | | |
|---|---|---|---|
| 5,461,109 A | 10/1995 | Blair et al. | |
| 5,830,938 A | 11/1998 | St. Laurent et al. | |
| 6,210,295 B1 | 4/2001 | Yoneyama | |
| 6,255,382 B1 | 7/2001 | Hamada et al. | |
| 6,387,385 B1 | 5/2002 | Wang | |
| 6,454,667 B1 | 9/2002 | Iwami | |
| 6,509,410 B2 | 1/2003 | Ohira et al. | |
| 7,141,628 B2 | 11/2006 | Isogawa et al. | |
| 7,371,193 B2 | 5/2008 | Isogawa et al. | |
| 7,638,580 B2 | 12/2009 | Sasaki et al. | |
| 8,137,753 B2 * | 3/2012 | Tarao et al. | 427/316 |
| 2001/0034398 A1 | 10/2001 | Ohira et al. | |
| 2004/0043838 A1 | 3/2004 | Isogawa et al. | |
| 2004/0116623 A1 | 6/2004 | Isogawa et al. | |
| 2005/0282660 A1 | 12/2005 | Isogawa et al. | |
| 2005/0282661 A1 | 12/2005 | Fujisawa et al. | |
| 2006/0178471 A1 | 8/2006 | Sasaki et al. | |
| 2007/0117654 A1 | 5/2007 | Sasaki | |
| 2009/0054570 A1 | 2/2009 | Wu et al. | |
| 2009/0110837 A1 | 4/2009 | Wachi | |
| 2010/0144468 A1 * | 6/2010 | Tarao et al. | 473/378 |
| 2010/0167847 A1 * | 7/2010 | Tarao et al. | 473/378 |
| 2011/0105247 A1 | 5/2011 | Tarao et al. | |

FOREIGN PATENT DOCUMENTS

| | | |
|---|---|---|
| JP | 8-71177 A | 3/1996 |
| JP | 10-151224 A | 6/1998 |
| JP | 2000-262649 A | 9/2000 |
| JP | 2000-288125 A | 10/2000 |
| JP | 2001-271027 A | 10/2001 |
| JP | 2002-284836 A | 10/2002 |
| JP | 2004-89364 A | 3/2004 |
| JP | 2004-187829 A | 7/2004 |
| JP | 2006-556 A | 1/2006 |
| JP | 2006-557 A | 1/2006 |
| JP | 2006-218046 A | 8/2006 |
| JP | 2007-143660 A | 6/2007 |
| JP | 2007-143661 A | 6/2007 |
| JP | 2007-260356 A | 10/2007 |

OTHER PUBLICATIONS

BYK Additives & Instruments, "Surface Additive to Improve Leveling and Substrate Wetting", BYK-340 product literature; Feb. 2008.
English Translation of Japanese Office Action dated Jan. 4, 2011 for Application No. 2008-311112.
English Translation of Japanese Office Action dated Jun. 26, 2012 for Application No. 2009-251329.
English Translation of Japanese Office Action dated Nov. 24, 2010 for Application No. 2008-334978.
English Translation of Japanese Office Action dated Sep. 11, 2012 for Application No. 2009-251329.
English Translation of Japanese Office Action dated Sep. 6, 2011 for Application No. 2008-311112.
US Office Action dated May 15, 2012 for U.S. Appl. No. 12/641,024.
English Translation of Japanese Office Action, dated Dec. 11, 2012, for Application No. 2009-251329.

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball which is excellent in the gloss and the evenness of the paint film and a golf ball aqueous paint therefor. The golf ball of the present invention has a paint film which is formed from a curing type polyurethane aqueous golf ball paint, comprising (A) an aqueous polyol composition and (B) an aqueous polyisocyanate, wherein (A) the aqueous polyol composition contains (a-1) an aqueous acrylic polyol, (a-2) an aqueous urethane polyol and (a-3) an aqueous polyurethane resin; a molar ratio (NCO/OH) of an isocyanate group of (B) the aqueous polyisocyanate to a hydroxyl group of (A) the aqueous polyol composition ranges from 1.25 to 2.50; and a content of a high boiling point solvent having a boiling point of 150° C. or more in the aqueous golf ball paint is more than 0 mass % and 10 mass % or less.

19 Claims, 2 Drawing Sheets

CURING TYPE POLYURETHANE AQUEOUS GOLF BALL PAINT AND PAINTED GOLF BALL USING THE SAME

FIELD OF THE INVENTION

The present invention relates to a curing type polyurethane aqueous golf ball paint and a painted golf ball.

DESCRIPTION OF THE RELATED ART

A conventional golf ball has a paint film on the surface of the golf ball body. The paint film is formed to protect the golf ball body from deteriorating due to the exposure of the golf ball body to a sunlight and/or the weather and to improve the appearance thereof by imparting a gloss to the golf ball body. Various paints for forming such a paint film have been developed. For example, Japanese Patent Publication No. 2001-271027 A discloses an aqueous paint composition for a golf ball, which includes a hydrophilic group-containing polyisocyanate, and a water-soluble urethane polyol having a hydroxyl value of 100 to 300 which is obtained through reaction between a polyol component and a polyisocyanate component. Japanese Patent Publication No. 2004-187829 A discloses a paint for a golf ball, which includes a polyisocyanate, and an aqueous liquid of an aqueous polyol which has a hydroxyl value from 50 mg KOH/g and below 100 mg KOH/g, and has a weight average molecular weight ranging from 4,000 to 20,000.

A golf ball is repeatedly hit and used. Therefore, the paint film for a golf ball needs to have an adhesion property against the impact. In particular, when a golf ball is hit, the golf ball body deforms. Unless the paint film covering the golf ball body does not follow the deformation of the golf ball body, the paint film tends to peel off. Further, the paint film may peel off when the golf ball is subject to the friction against the club surface when hitting the golf ball or against the ground surfaces such as sand in a bunker or rough when landing on the ground.

As a method for enhancing the adhesion of a paint film to the surface of a golf ball body, Japanese Patent Publication No. 2006-557 A discloses, for example, a method for producing a golf ball in which a marking is placed on the surface of a golf ball body, and a two-component curing type aqueous paint which includes a base material, a curing agent, and a solvent is used as an aqueous paint for forming a paint film, and a resin component for forming the marking is cured by using the curing agent included in the aqueous paint.

As a golf ball having an enhanced adhesion of a paint film to the surface of a golf ball body, Japanese Patent Publication No. 2006-218046 A discloses a golf ball, having a golf ball body and a paint film covering the golf ball body, in which the paint film is obtained by curing a paint composition which contains a carboxyl group-containing aqueous polyol, an aqueous polyisocyanate, and an aqueous polycarbodiimide.

SUMMARY OF THE INVENTION

As described above, applying an aqueous paint to the surface of the golf ball body has been proposed. However, since the surface of the golf ball body has a unique shape formed with dimples, there are problems that the paint film has an uneven thickness and poor surface gloss when the aqueous paint was applied. Further, if high boiling point solvents such as a thixotropic agent and a leveling agent are added to make the paint film have the even thickness, drying time becomes very long, resulting in a problem of low productivity. The present invention has been made in view of the above circumstances, and an object of the present invention is to provide an aqueous golf ball paint imparting the surface gloss to the golf ball body, drying well, and forming the paint film with an even thickness. Another object of the invention is to provide a painted golf ball using the above aqueous golf ball paint.

The inventors of the present invention have addressed the above problems and made the present invention based on the following findings. The sagging of the aqueous paint applied to the golf ball body surface having a unique shape like dimples is effectively suppressed by firstly lowering the surface tension of the aqueous paint to improve the wettability of the aqueous paint to the golf ball body surface, and secondly by improving the leveling of the aqueous paint. The present invention that has solved the problems is directed to a curing type polyurethane aqueous golf ball paint, comprising (A) an aqueous polyol composition and (B) an aqueous polyisocyanate, wherein (A) the aqueous polyol composition contains (a-1) an aqueous acrylic polyol, (a-2) an aqueous urethane polyol and (a-3) an aqueous polyurethane resin;

a molar ratio (NCO/OH) of an isocyanate group of (B) the aqueous polyisocyanate to a hydroxyl group of (A) the aqueous polyol composition ranges from 1.25 to 2.50; and a content of a high boiling point solvent having a boiling point of 150° C. or more in the aqueous golf ball paint is more than 0 mass % and 10 mass % or less.

That is, the aqueous paint of the present invention contains (a-1) an aqueous acrylic polyol improving the gloss of the paint film, (a-2) an aqueous urethane polyol improving the adhesion of the paint film to the surface of the golf ball body, and (a-3) an aqueous polyurethane resin improving the tensile properties of the paint film to follow the deformation of the golf ball body when hit. Therefore, the paint film formed has a gloss and excellent adhesion to the surface of the golf ball. The high boiling point solvent having a boiling point of 150° C. or more contained in the aqueous paint of the present invention improves the leveling of the aqueous paint as well as lowers the surface tension of the aqueous paint to improve the wettability to the surface of the golf ball body. As a result, the paint film having an even thickness is formed on the surface of the golf ball body. Further, since the content of the high boiling point solvent having a boiling point of 150° C. or more is 10 mass % or less, the paint drying step does not become longer.

The present invention also provides a painted golf ball having a paint film formed from the above aqueous paint of the present invention.

According to the present invention, it is possible to provide a golf ball aqueous paint forming a paint film with an even thickness and imparting a surface gloss to the golf ball body. Further, it is also possible to provide a golf ball having a paint film with an even thickness and a surface gloss in a golf ball having a paint film formed from an aqueous paint.

DESCRIPTION OF THE PREFERRED EMBODIMENT

Figure 1:
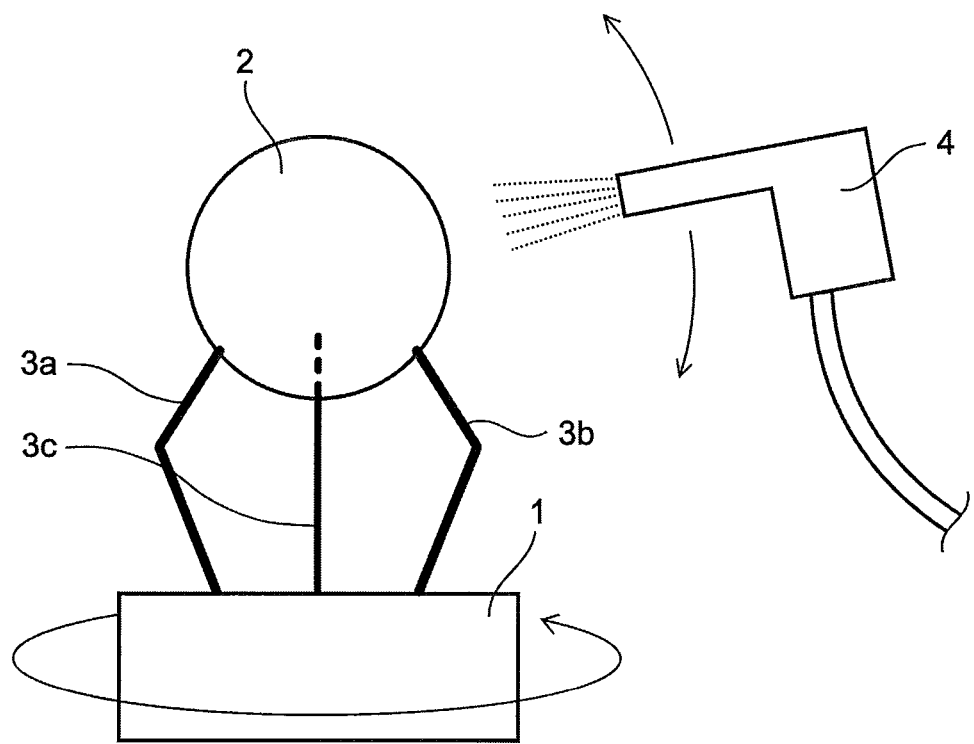
FIG. 1 is a schematic view illustrating an embodiment applying the paint with an air gun.

The present invention provides a curing type polyurethane aqueous golf ball paint, comprising (A) an aqueous polyol composition and (B) an aqueous polyisocyanate, wherein (A) the aqueous polyol composition contains (a-1) an aqueous acrylic polyol, (a-2) an aqueous urethane polyol and (a-3) an aqueous polyurethane resin;

a molar ratio (NCO/OH) of an isocyanate group of (B) the aqueous polyisocyanate to a hydroxyl group of (A) the aqueous polyol composition ranges from 1.25 to 2.50; and a content of a high boiling point solvent having a boiling point of 150° C. or more in the aqueous golf ball paint is more than 0 mass % and 10 mass % or less.

In the present invention, the term "aqueous" used herein includes both "water-soluble" and "water-dispersible". "Curing type polyurethane aqueous paint" forms a paint film by generating a polyurethane through curing reaction between (A) the aqueous polyol composition and (B) the aqueous polyisocyanate.

First, (A) the aqueous polyol composition used in the present invention will be explained. (A) The aqueous polyol composition contains (a-1) an aqueous acrylic polyol, (a-2) an aqueous urethane polyol, and (a-3) an aqueous polyurethane resin.

(a-1) The aqueous acrylic polyol is an aqueous acrylic resin or aqueous acrylic polymer having a plurality of hydroxyl groups, and is obtained, for example, by copolymerizing a (meth)acrylic monomer having a hydroxyl group and a (meth)acrylic monomer having no hydroxyl group.

Examples of the (meth)acrylic monomer having a hydroxyl group include (meth)acrylic acid esters having a hydroxyl group, such as 2-hydroxyethyl (meth)acrylate, 2-hydroxypropyl(meth)acrylate, 2-hydroxybutyl(meth)acrylate, alkylene glycol mono(meth)acrylate, and polyalkylene glycol mono(meth)acrylate. These (meth)acrylic monomers having a hydroxyl group may be used individually or in combination of two or more of them.

Examples of the (meth)acrylic monomer having no hydroxyl group include: (meth)acrylic unsaturated carboxylic acids such as (meth)acrylic acid; (meth)acrylic acid ester such as methyl(meth)acrylate, ethyl(meth)acrylate, propyl (meth)acrylate, isopropyl(meth)acrylate, butyl(meth)acrylate, isobutyl (meth)acrylate, pentyl(meth)acrylate, hexyl (meth)acrylate, 2-ethylhexyl (meth)acrylate, cyclohexyl (meth)acrylate, octyl(meth)acrylate, and decyl (meth) acrylate; and another (meth)acrylic monomer such as (meth) acrylonitrile, and (meth)acrylamide. These (meth)acrylic monomers having no hydroxyl group may be used individually or in combination of two or more of them. In the present invention, the term "(meth)acrylic" means "acrylic" and/or "methacrylic."

Further, in addition to the (meth)acrylic monomer, (a-1) the aqueous acrylic polyol may contain another monomer component which has a hydroxyl group and/or another monomer component which has no hydroxyl group, as long as they do not impair the effects of the present invention. Examples of another monomer component which has a hydroxyl group include unsaturated alcohols such as 3-methyl-3-butene-1-ol, 3-methyl-2-butene-1-ol, 2-methyl-3-butene-2-ol, 2-methyl-2-butene-1-ol, 2-methyl-3-butene-1-ol, and allyl alcohol. Examples of another monomer component which has no hydroxyl group include: aromatic vinyl compounds such as styrene and α-methyl styrene; and ethylenically unsaturated carboxylic acids such as maleic acid and itaconic acid. These other monomer components may be used individually or in combination of two or more of them.

The hydroxyl value of (a-1) the aqueous acrylic polyol is preferably 50 mg KOH/g or more, and more preferably 60 mg KOH/g or more, and even more preferably 70 mg KOH/g or more, and is preferably 150 mg KOH/g or less, and more preferably 140 mg KOH/g or less, and even more preferably 130 mg KOH/g or less. If the hydroxyl value of (a-1) the aqueous acrylic polyol falls within the above range, the gloss of the paint film can be further improved. In addition, the hardness and water-resistance of the paint film can be improved. In the present invention, the hydroxyl value can be measured by using, for example, an acetylization method, in accordance with JIS K 1557-1.

The glass transition temperature of (a-1) the aqueous acrylic polyol is preferably 20° C. or more, and more preferably 22° C. or more, and even more preferably 25° C. or more, and is preferably 60° C. or less, and more preferably 57° C. or less, and even more preferably 55° C. or less. If the glass transition temperature of (a-1) the aqueous acrylic polyol falls within the above range, the production of the aqueous paint becomes easy. Further, the impact-resistance of the paint film can be enhanced.

The weight average molecular weight of (a-1) the aqueous acrylic polyol is preferably 3,000 or more, and more preferably 5,000 or more, and even more preferably 8,000 or more, and is preferably 50,000 or less, and more preferably 45,000 or less, and even more preferably 40,000 or less. If the weight average molecular weight of (a-1) the aqueous acrylic polyol falls within the above range, the water-resistance and impact-resistance of the paint film can be enhanced. The weight average molecular weight of (a-1) the aqueous acrylic polyol can be measured, for example, by gel permeation chromatography (GPC), using polystyrene as a standard material, tetrahydrofuran as an eluate, and an organic solvent system GPC columns (for example, by using "Shodex (registered trademark) KF series" available from Showa Denko K. K.).

Further, the average number (average hydroxyl group number) of hydroxyl groups contained in a molecule of (a-1) the aqueous acrylic polyol is preferably 5 or more, and more preferably 10 or more, and even more preferably 20 or more, and is preferably 100 or less, and more preferably 50 or less, and even more preferably 40 or less. If the average hydroxyl group number of (a-1) the aqueous acrylic polyol is 5 or more, because of the high reactivity with (B) the aqueous polyisocyanate, a tough paint film can be formed and the adhesion to the surface of the golf ball body becomes better. If the average hydroxyl group number is 100 or less, the water-resistance of the paint film formed becomes good. It is noted that the average hydroxyl group number of (a-1) the aqueous acrylic polyol can be calculated based on the hydroxyl value and the weight average molecular weight.

(a-1) The aqueous acrylic polyol is preferably used in the form of an aqueous liquid in which (a-1) the aqueous acrylic polyol is dissolved or dispersed in water. A method for modifying the acrylic polyol to be dissolved or dispersed in water includes, without any limitation, for example, a method in which a monomer such as an unsaturated carboxylic acid having a carboxyl group like (meth)acrylic acid and maleic acid is copolymerized, and the carboxyl group is neutralized with a base, or a method in which a (meth)acrylic monomer having a hydroxyl group is subjected to the emulsion-polymerization in the presence of an emulsifier.

When the aqueous liquid in which (a-1) the aqueous acrylic polyol is dissolved or dispersed in water is used, the content (non-volatile content) of (a-1) the aqueous acrylic polyol component in the aqueous liquid is preferably 20 mass % or more, more preferably 25 mass % or more, even more preferably 30 mass % or more, and is preferably 70 mass % or less, more preferably 65 mass % or less, and even more preferably 60 mass % or less. If the content of (a-1) the aqueous acrylic polyol component in the aqueous liquid falls within the above range, (a-1) the aqueous acrylic polyol can be easily mixed with (a-2) the aqueous urethane polyol or the like, thereby facilitating the preparation of (A) the aqueous polyol composition. A method for measuring the non-volatile content will be described later.

Specific examples of (a-1) the aqueous acrylic polyol include an aqueous acrylic polyol (hydroxyl value: 108 mg KOH/g, glass transition temperature: 46° C.) available from SHINTO PAINT CO., LTD., and trade names "Bayhydrol (registered trademark) VPLS2058", "Bayhydrol (registered trademark) VPLS2235", available from Sumika Bayer Urethane Co., Ltd.

Next, (a-2) the aqueous urethane polyol contained in (A) the aqueous polyol composition will be described.

(a-2) The aqueous urethane polyol is an aqueous compound having a plurality of urethane bonds in its molecule, and having at least two hydroxyl groups in a molecule thereof. (a-2) The aqueous urethane polyol is, for example, a hydroxyl group terminated urethane prepolymer, which is obtained by reaction between a polyisocyanate component and an polyol component, under a condition that the hydroxyl groups of the aqueous polyol component is excessive to the isocyanate groups of the polyisocyanate component.

Examples of the polyol include a low molecular weight polyol having a molecular weight of less than 500 and a high molecular weight polyol having a molecular weight of 500 or more. Examples of the low molecular weight polyol are a diol such as ethylene glycol, diethylene glycol, triethylene glycol, 1,3-butanediol, 1,4-butanediol, neopentyl glycol, 1,6-hexanediol; and a triol such as glycerin, trimethylol propane, and hexane triol. Examples of the high-molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol.

The polyisocyanate component which can constitute (a-2) the aqueous urethane polyol is not limited, as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene-diisocyanate (TMXDI), para-phenylene diisocyanate (PPDI); an alicyclic polyisocyanate or aliphatic polyisocyanate such as 4,4'-dicyclohexylmethane diisocyanate ($H_{12}MDI$), hydrogenated xylylenediisocyanate ($H_6XDI$), hexamethylene diisocyanate (HDI), isophorone diisocyanate (IPDI), and norbornene diisocyanate (NBDI). These may be used either alone or as a mixture of at least two of them.

The hydrophilic group used for modifying the urethane polyol to be aqueous can be introduced from either the polyol component or the polyisocyanate component. Introducing from the polyol component is preferable. In the case of introducing the hydrophilic group from the polyol component, the polyol having the hydrophilic group is specifically used. The hydrophilic group includes, for example, ionic functional groups such as a carboxyl group, sulfonic acid group, or amino group; or a polyoxyethylene chain.

The polyol having a hydrophilic group includes, for example, aqueous polymer polyol such as an aqueous polyester polyol, aqueous polyether polyol in addition to a low molecular weight polyol having a hydrophilic group. The low molecular weight polyol having a hydrophilic group includes a dimethylol propionic acid, dimethylol butanoic acid, dihydroxy propionic acid, and dihydroxysuccinic acid.

The aqueous polyester polyol which can constitute (a-2) the aqueous urethane polyol may be any one of a water-soluble polyester polyol or a water-dispersible polyester polyol. For example, a polyester polyol having a carboxyl group, a polyester polyol having a sulfonic acid group, and the like may be used as the aqueous polyester polyol. As the aqueous polyester polyol, an aqueous polyester polyol having a carboxyl group is particularly preferable, and is dissolved or dispersed in water by neutralizing the carboxyl group thereof with a base.

The aqueous polyester polyol having a carboxyl group may be synthesized in a known method for synthesizing a polyester polyol, and can be obtained through, for example, polycondensation of a low molecular weight polyol and a polybasic acid. Further, the carboxyl group used for modifying the polyester polyol to be aqueous can be introduced from any one of the low molecular weight polyol or the polybasic acid. Examples of the low molecular weight polyol for introducing the carboxyl group in the polyester polyol include dimethylol propionic acid, dimethylol butanoic acid, dihydroxy propionic acid, and dihydroxysuccinic acid. Examples of the polybasic acid for enabling introduction of the carboxyl group in the polyester polyol include trimellitic anhydride, and pyromellitic anhydride.

The aqueous polyether polyol component which can constitute (a-2) the aqueous urethane polyol preferably includes, for example, polyethylene glycol. The aqueous polyether polyol is dissolved or dispersed in water by simply mixing it with water and stirring them. Further, the polyether polyol may be dissolved or dispersed while being heated, where necessary.

The hydroxyl value of (a-2) the aqueous urethane polyol is preferably 50 mg KOH/g or more, more preferably 60 mg KOH/g or more, even more preferably 70 mg KOH/g or more, and is preferably 500 mg KOH/g or less, more preferably 450 mg KOH/g or less, 400 mg KOH/g or less. If the hydroxyl value of (a-2) the aqueous urethane polyol falls within the above range, it would be possible to further improve the adhesion of the paint film to the golf ball body.

The weight average molecular weight of (a-2) the aqueous urethane polyol is preferably 200 or more, and more preferably 250 or more, and even more preferably 300 or more, and is preferably 50,000 or less, and more preferably 45,000 or less, and even more preferably 40,000 or less. If the weight average molecular weight of (a-2) the aqueous urethane polyol falls within the above range, the water-resistance and impact-resistance of the paint film can be enhanced. The weight average molecular weight of (a-2) the aqueous urethane polyol can be measured, for example, by gel permeation chromatography (GPC), using polystyrene as a standard material, tetrahydrofuran as an eluate, and an organic solvent system GPC columns (for example, by using "Shodex (registered trademark) KF series" available from Showa Denko K. K.).

Further, the average number of hydroxyl groups (average hydroxyl group number) contained in one molecule of (a-2) the aqueous urethane polyol is preferably 1.0 or more, more preferably 1.5 or more, even more preferably 2 or more, and is preferably 50 or less, and more preferably 45 or less, and even more preferably 40 or less. If the average number of hydroxyl group of (a-2) the aqueous urethane polyol is 1.0 or more, reactivity to (B) the aqueous polyisocyanate is high and thus a tough paint film can be formed and the adhesion to the surface of the golf ball body becomes better. If the average hydroxyl group number is 50 or less, the water-resistance of the paint film formed becomes better. The average hydroxyl group number of (a-2) the aqueous urethane polyol can be calculated based on the hydroxyl value and the weight average molecular weight.

(a-2) The aqueous urethane polyol is preferably used in the form of an aqueous liquid in which (a-2) the aqueous urethane polyol is dissolved or dispersed in water. For example, if an aqueous liquid in which (a-2) the aqueous urethane polyol is dissolved or dispersed in water is used, the content (non-volatile content) of (a-2) the aqueous urethane polyol component in the aqueous liquid is preferably 20 mass % or more, more preferably 23 mass % or more, even more preferably 25 mass % or more, and is preferably 95 mass % or less, more preferably 93 mass % or less, even more preferably 90 mass % or less. If the content of (a-2) the aqueous urethane polyol component in the aqueous liquid falls within the above range, (a-2) the aqueous urethane polyol can be easily mixed with (a-1) the aqueous acrylic polyol or the like, thereby facilitating the preparation of (A) the aqueous polyol composition. A method for measuring the non-volatile content will be described later.

Specific examples of the aqueous liquid of (a-2) the aqueous urethane polyol include trade names "FLEXOREZ (registered trademark) UD-350W" and "FLEXOREZ (registered trademark) UD-320" available from King Industries, Inc., and trade name "Bayhydrol (registered trademark) VPLS2056" available from Sumika Bayer Urethane Co., Ltd.

Next, (a-3) the aqueous polyurethane resin contained in (A) the aqueous polyol composition will be described. (a-3) The aqueous polyurethane resin is not particularly limited, as long as it is an aqueous resin having a plurality of urethane bonds within the molecule. For example, the polyurethane resin is a product having a urethane bonds formed in a molecule thereof by a reaction between a polyisocyanate component with a high molecular weight polyol component. Further, a chain extension reaction with a low molecular weight polyol or a low molecular weight polyamine may be performed where necessary Examples of the polyisocyanate component which can constitute (a-3) the aqueous polyurethane resin, include polyisocyanates exemplified as being used for (a-2) the aqueous urethane polyol.

Examples of the polyol component which can constitute (a-3) the aqueous polyurethane resin, includes polyols exemplified as being used for (a-2) the aqueous urethane polyol.

The polyamine component that constitutes the polyurethane resin where necessary may include any polyamine, as long as it has at least two amino groups. The polyamine component includes an aliphatic polyamine such as ethylenediamine, propylenediamine, and hexamethylenediamine, an aromatic polyamine such as tolylenediamine, xylylenediamine, and diaminodiphenyl methane; and an alicyclic polyamine such as diaminocyclohexyl methane, piperazine, isophoronediamine; hydrazine or derivatives thereof such as succinic acid dihydrazide, adipic acid dihydrazide, phthalic acid dihydrazide. As the low molecular weight polyol or low molecular weight polyamine, alkanolamine such as diethanolamine, monoethanolamine can be used.

The polyurethane resin has no limitation on the constitutional embodiments thereof. Examples of the constitutional embodiments are the embodiment where the polyurethane resin consists of the polyisocyanate component and the high-molecular weight polyol component; the embodiment where the polyurethane resin consists of the polyisocyanate component, the high-molecular weight polyol component and the low-molecular weight polyol component; and the embodiment where the polyurethane resin consists of the polyisocyanate component, the high-molecular weight polyol component, the low-molecular weight polyol component, and the polyamine component; and the embodiment where the polyurethane resin consists of the polyisocyanate component, the high-molecular weight polyol component and the polyamine component.

Each of (a-3) the aqueous polyurethane resin and (a-2) the aqueous urethane polyol has a plurality of urethane bonds in its molecule. (a-2) The aqueous urethane polyol has at least two hydroxyl groups in one molecule, whereas (a-3) the aqueous polyurethane resin substantially has no hydroxyl group. That is, a hydroxyl value of (a-3) the aqueous polyurethane resin is less than or equal to 5 mg KOH/g.

The glass transition temperature of (a-3) the aqueous polyurethane resin is preferably 20° C. or less, more preferably 15° C. or less, and even more preferably 10° C. or less. If the glass transition temperature of (a-3) the aqueous urethane resin is 20° C. or less, the elongation of the aqueous polyurethane resin is increased, and the tensile property of the paint film is enhanced. The lower limit of the glass transition temperature of (a-3) the aqueous polyurethane resin is not limited, but may be −50° C. The glass transition temperature of (a-3) the aqueous polyurethane resin can be measured by using, for example, a dynamic viscoelasticity measurement apparatus.

The elongation of (a-3) the aqueous polyurethane resin is preferably 100% or more, and more preferably 150% or more, and even more preferably 200% or more, and is preferably 2,000% or less, more preferably 1,900% or less, and even more preferably 1,800% or less. If the elongation of (a-3) the aqueous polyurethane resin falls within the above range, the adhesion of the paint film to the surface of a golf ball body can be enhanced. The elongation of (a-3) the aqueous urethane resin can be measured by using, for example, Autograph available from SHIMADZU CORPORATION.

In the present invention, the glass transition temperature and the elongation of (a-3) the aqueous polyurethane resin are physical property values of the film obtained from (a-3) the aqueous polyurethane resin, and the measurement methods will be described later.

(a-3) The aqueous polyurethane resin is preferably used in the form of an aqueous liquid in which (a-3) the aqueous polyurethane resin is dissolved or dispersed in water. For example, when an aqueous liquid in which (a-3) the aqueous urethane resin is dissolved or dispersed in water is used, the content (non-volatile content) of (a-3) the aqueous polyurethane resin component in the aqueous liquid is preferably 10 mass % or more, more preferably 12 mass % or more, and even more preferably 15 mass % or more, and is preferably 50 mass % or less, more preferably 47 mass % or less, and even more preferably 45 mass % or less. When the content of (a-3) the aqueous polyurethane resin component in the aqueous liquid falls within the above range, (a-3) the aqueous polyurethane resin can be easily mixed with (a-1) the aqueous acrylic polyol or the like, thereby facilitating the preparation of (A) the aqueous polyol composition. A method for measuring the non-volatile content will be described later.

If a water dispersion is used as (a-3) the aqueous polyurethane resin, the volume average particle diameter of the urethane resin is preferably 50 nm or more, more preferably 55 nm or more, and even more preferably 60 nm or more, and is preferably 300 nm or less, more preferably 250 nm or less, and even more preferably 200 nm or less. If the volume average particle diameter of the dispersed urethane resin falls within the above range, the gloss of the paint film can be enhanced. The volume average particle diameter of the urethane resin dispersed in water can be measured by using a laser diffraction/scattering type particle size distribution measurement apparatus.

As a method for dissolving or dispersing (a-3) the aqueous polyurethane resin in water, for example, a self-emulsification method or a phase inversion emulsification method may be used.

In the self-emulsification method, the polyurethane resin is dissolved or dispersed in water, without using an emulsifier, by introducing an ionic group in a molecule of the polyurethane resin. For example, the polyurethane resin can be dissolved or dispersed in water by introducing a carboxyl group in a molecule of the polyurethane resin and neutralizing the carboxyl group. The ionic group includes functional groups such as a carboxyl group or an amino group which can be ionized (but not yet ionized) and ionized functional groups where the ionizable functional group is neutralized with an inorganic metal compound or amines.

As a method for introducing the ionic group in a molecule of the polyurethane resin, a known method can be employed. For example, a method in which a polyol having an ionic group is used as a part or the whole of the polyol component, a method in which a chain extender having an ionic group is used as a part or the whole of the chain extender components, or a method in which the polyol and the chain extender each having an ionic group are used as a part of the polyol component and a part or the whole of the chain extender components, respectively, may be employed.

The polyol having the ionic group includes, for example, a polyester polyol having a carboxyl group or a polyester polyol having a sulfonic acid group, which are exemplified as polyols used for (a-2) the aqueous urethane polyol. Examples of the chain extender having the ionic group include low molecular weight polyols such as dimethylol propionic acid, dimethylol butanoic acid, dihydroxy propionic acid, and dihydroxysuccinic acid.

In the phase inversion emulsification method, a relatively low molecular weight urethane prepolymer is forced to be emulsified and dispersed by a high shear in the presence of an emulsifier, and is thereafter subjected to chain extension reaction with a low molecular weight polyol component or a low molecular weight polyamine component.

Specific examples of (a-3) the aqueous polyurethane resin include trade names "SUPERFLEX (registered trademark) 300" and "SUPERFLEX (registered trademark) 500H" available from Dai-ichi Kogyo Seiyaku Co., Ltd.

The content of (a-3) the aqueous polyurethane resin in (A) the aqueous polyol composition is preferably 20 mass % or more, more preferably 25 mass % or more, and even more preferably 30 mass % or more, and is preferably 80 mass % or less, more preferably 75 mass % or less, and even more preferably 70 mass % or less. If the content of (a-3) the aqueous polyurethane resin in (A) the aqueous polyol composition falls within the above range, the adhesion of the paint film to the surface of a golf ball body can be enhanced.

Further, as the blending ratio of (a-1) the aqueous acrylic polyol to (a-2) the aqueous urethane polyol in (A) the aqueous polyol composition (when the total is 100% by mass), (a-1) the aqueous acrylic polyol/(a-2) the aqueous urethane polyol is preferably 40 mass % to 90 mass %/60 mass % to 10 mass %, more preferably 45 mass % to 90 mass %/55 mass % to 10 mass %, and even more preferably 50 mass % to 90 mass %/50 mass % to 10 mass %. If the blending ratio (a-1)/(a-2) falls within the above range, the gloss of the paint film which is obtained from the curing type polyurethane aqueous paint of the present invention, the adhesion thereof to the golf ball body, and the durability thereof can be improved.

(A) The aqueous polyol composition preferably contains water as a dispersion medium. In this case, the non-volatile content in (A) the aqueous polyol composition is preferably 20 mass % or more, more preferably 25 mass % or more, and even more preferably 30 mass % or more, and is preferably 85 mass % or less, more preferably 80 mass % or less, and even more preferably 75 mass % or less. If the non-volatile content in (A) the aqueous polyol composition is 20 mass % or more, reactivity between (A) the aqueous polyol composition and (B) the aqueous polyisocyanate described below becomes good. Further, if the non-volatile content in (A) the aqueous polyol composition is 85 mass % or less, the viscosity is not excessively high, and the painting becomes good. A method for measuring the non-volatile content will be described below.

(B) The aqueous polyisocyanate will be described. (B) The aqueous polyisocyanate is not limited, as long as it is any aqueous compound having a plurality of isocyanate groups. For example, (B) the aqueous polyisocyanate may be an aqueous polyisocyanate obtained by modifying a polyisocyanate component with polyoxyalkylene ether alcohol.

The polyisocyanate component constituting (B) the aqueous polyisocyanate includes, for example, an aromatic polyisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bi-tolylene-4,4'-diisocyanate (TODI), xylylene diisocyanate (XDI), tetramethylxylylenediisocyanate(TMXDI) and para-phenylene diisocyanate (PPDI); and an alicyclic or aliphatic polyisocyanate such as 4,4'-dicyclohexylmethane diisocyanate ($H_{12}$MDI), hydrogenated xylylenediisocyanate($H_6$XDI), hexamethylene diisocyanate (HDI), isophorone diisocyanate (IPDI), norbornene diisocyanate (NBDI) and derivatives thereof.

Examples of the derivative of the polyisocyanate include: isocyanurate of diisocyanate; an adduct obtained through reaction between a diisocyanate and a low molecular weight triol such as trimethylolpropane or glycerin (it is preferable that a free diisocyanate is removed); an allophanate-modified product; and a biuret-modified product. One example of the allophanate-modified product is a trifunctional polyisocyanate which is obtained by further reacting a diisocyanate with a urethane bond formed through a reaction between a diisocyanate and a low molecular weight diol. One example of the biuret-modified products is a trifunctional polyisocyanate which is obtained by further reacting a diisocyanate with a urea bond formed through a reaction between a diisocyanate and a low molecular weight diamine. The polyisocyanates and the derivatives thereof may be used individually or in combination of two or more types.

(B) The aqueous polyisocyanate preferably contains, as a polyisocyanate component, (b-1) hexamethylene diisocyanate and/or a derivative thereof, and (b-2) isophorone diisocyanate and/or a derivative thereof. (B) The aqueous polyisocyanate more preferably consists of (b-1) hexamethylene diisocyanate and/or a derivative thereof and (b-2) isophorone diisocyanate and/or a derivative thereof. According to this embodiment, the weather-resistance of the paint film obtained from the curing type polyurethane aqueous paint of the present invention is enhanced.

As (b-1) the hexamethylene diisocyanate and/or a derivative thereof, an isocyanurate of hexamethylene diisocyanate is preferable. Further, as (b-2) the isophorone diisocyanate and/or a derivative thereof, an isocyanurate of isophorone diisocyanate is preferable.

As the blending ratio of (b-1) the hexamethylene diisocyanate and/or a derivative thereof, to (b-2) the isophorone diisocyanate and/or a derivative thereof in (B) the aqueous polyisocyanate (when the total is 100% by mass), (b-1) the hexamethylene diisocyanate and/or a derivative thereof/(b-2) the isophorone diisocyanate and/or a derivative thereof is preferably 50 mass % to 99 mass %/50 mass % to 1 mass %, more preferably 55 mass % to 95 mass %/45 mass % to 5 mass %, and even more preferably 60 mass % to 90 mass %/40 mass % to 10 mass %. If the blending ratio ((b-1)/(b-2)) falls within the above range, the adhesion of the paint film obtained from the curing type polyurethane aqueous paint of the present invention to a golf ball body, and the durability thereof can be enhanced.

Specific examples of (B) the aqueous polyisocyanate include trade name "CR-60N" available from DIC Corporation, trade names "CORONATE (registered trademark) C3062, C3053" available from NIPPON POLYURETHANE INDUSTRY CO., LTD., trade names "Bayhydur (registered trademark) 3100" and "Bayhydur (registered trademark) 401-70" available from Sumika Bayer Urethane Co., Ltd., trade name "1-3" available from SHINTO PAINT CO., LTD., and trade name "WG-6B" available from Wayaku Paint Co., Ltd.

In the curing type polyurethane aqueous paint according to the present invention, the molar ratio (NCO/OH) of the isocyanate group (NCO) of (B) the aqueous polyisocyanate to the hydroxyl group (OH) of (A) the aqueous polyol composition is preferably 1.25 or more, and is preferably 2.50 or less. If the molar ratio (NCO/OH) is less than 1.25, the amount of the isocyanate groups is too small, and leveling effect cannot be obtained. Therefore, the appearance of the obtained paint film may deteriorate. Further, if the molar ratio (NCO/OH) is more than 2.50, the amount of the isocyanate groups is excessive, and the appearance of the obtained paint film may deteriorate as well as the obtained paint film may be hard and fragile. The appearance of the obtained paint film deteriorates because an excessive amount of isocyanate groups in the paint may promote a reaction between the moisture in the air and the isocyanate groups, thereby generating a lot of carbon dioxide gas. The molar ratio (NOC/OH) is preferably 1.25 or more, more preferably 1.30 or more, and is preferably 2.5 or less, more preferably 2.4 or less.

The content of the high boiling point solvent having a boiling point of 150° C. or more in the curing type polyurethane aqueous paint is more than 0 mass % and 10 mass % or less. Containing the high boiling point solvent having a boiling point of 150° C. or more lowers the surface tension of the aqueous paint and improves the wettability to the golf ball body. Further, the high boiling point solvent having a boiling point of 150° C. or more lowers the drying speed of the paint and improves the leveling of the paint. As a result, the appearance of the obtained golf ball improves. The content of the high boiling point solvent having a boiling point of 150° C. or more is preferably 0.5 mass % or more, more preferably 1.0 mass % or more. On the other hand, if the content of the high boiling point solvent is too high, drying temperature of the aqueous paint is getting high or the drying time is getting longer. Thus, the content of the high boiling point solvent having a boiling point of 150° C. or more is preferably 10 mass % or less, more preferably 9.5 mass % or less, even more preferably 9.0 mass % or less. The high boiling point solvent having a boiling point of 150° C. or more may be contained in either (A) the aqueous polyol composition or (B) the aqueous polyisocyanate. If the high boiling point solvent is not contained in any component, the high boiling point solvent can be post added to the two-component curing type polyurethane aqueous paint. The content of the high boiling point solvent having a boiling point of 150° C. or more can be adjusted, for example, by controlling proportions of each component. If the high boiling point solvent is post added, the content of the high boiling point solvent can be adjusted by an amount of the high boiling point solvent post added or water added where necessary. The content of the high boiling point solvent having a boiling point of 150° C. or more can be measured by, for example, gas chromatography.

The high boiling point solvent having a boiling point of 150° C. or more preferably contains a high boiling point solvent having a boiling point of 155° C. or more, more preferably a high boiling point solvent having a boiling point of 160° C. or more, even more preferably a high boiling point solvent having a boiling point of 180° C. or more. In a more preferable embodiment, the curing type polyurethane aqueous paint contains the high boiling point solvent having a boiling point of 150° C. or more in a content of more than 0 mass % and 10 mass % or less and contains the high boiling point solvent having a boiling point of 180° C. or more in a content of more than 0 mass % to 5 mass % or less. Use of the high boiling point solvent having a boiling point of 180° C. or more provides the golf ball with the better appearance. The content of the high boiling point solvent having a boiling point of 180° C. or more is preferably 1.5 mass % or more, more preferably 2.0 mass % or more, and is preferably 4.5 mass % or less, more preferably 4.0 mass % or less. The boiling point of the high boiling point solvent used in the present invention is preferably 400° C. or less, more preferably 380° C. or less, even more preferably 360° C. or less. If the boiling point is 400° C. or less, the drying time does not become too long. It is noted that the boiling point is a boiling point measure under the atmospheric pressure.

Specific examples of the high boiling point solvent having a boiling point of 150° C. or more (boiling point) are glycolic ether type solvents such as ethyleneglycol monobutylether (171° C.), diethyleneglycol dimethylether (162° C.), dipropyleneglycol dimethylethyer (171° C.), diethyleneglycol ethylmethylether (176° C.), dipropyleneglycol monomethylether (188° C.), dipropyleneglycol n-butylether (230° C.), diethyleneglycol diethylether (189° C.), diethyleneglycol monomethylether (194° C.), diethyleneglycol butylmethylether (212° C.), tripropyleneglycol dimethylethyer (215° C.), trietyleneglycol dimethylethyer (216° C.), diethyleneglycol monobutylether (230° C.), ethyleneglycol monophenylether (245° C.), trietyleneglycol monomethylethyer (249° C.), diethyleneglycol dibutylether (256° C.), trietyleneglycol butylmethylethyer (261° C.), polyethyleneglycol dimethylether (264° C. to 294° C.), tetraethyleneglycol dimethylether (275° C.), polyethyleneglycol monomethylether (290° C. to 310° C.); glycolic ester type solvents such as diethyleneglycol monoethylether acetate (217° C.), and diethyleneglycol monobutylether acetate (247° C.); phthalic acid esters such as dimethyl phthalate (282° C.), diethyl phthalate (298° C.), dibutyl phthalate (340° C.), bis(2-ethylhexyl) phthalate (390° C.), butylbenzyl phthalate (370° C.), ethylphthalylethylglycolate (310° C.); aliphatic dibasic esters such as bis(2-ethylhexyl) adipate (335° C.), dibutyl sebacate (345° C.), bis(2-ethylhexyl) sebacate (377° C.); other solvents such as propyleneglycol (187° C.), 2,2,4-trimethyl-1,3-pentanediol monoisobutyrate (244° C.), N-methyl-2-pyrrolidone (204° C.), N,N-dimethylformamide (153° C.). These solvents may be used individually or as a mixture of at least two of them. Among them, 2,2,4-trimethyl-1,3-pentanediol monoisobutyrate (244° C.), dipropyleneglycol n-butylether (230° C.), diethyleneglycol monobutylether (230° C.), or ethyleneglycol monophenylether (245° C.) is preferable.

The viscosity of the curing type polyurethane aqueous paint of the present invention is preferably 50 mPa·s or more, more preferably 60 mPa·s or more, even more preferably 70 mPa·s or more, and is preferably 350 mPa·s or less, more preferably 340 mPa·s or less, 330 mPa·s or less. If the viscosity is 50 mPa·s or more, the paint does not sag when applying the paint on the surface of the golf ball body, and the paint film having the even thickness to the higher extent can be obtained, and if the viscosity is 350 mPa·s or less, spraying becomes good and thus, the appearance (gloss) of the painted golf ball becomes better in the case of spraying the paint with an air gun. The method of measuring the viscosity of the curing type polyurethane aqueous paint will be described later.

In the present invention, the change in the viscosity of the curing type polyurethane aqueous paint used in the present invention is within the rise by about 10 mPa·s within 2 hours after (A) the aqueous polyol composition and (B) the aqueous polyisocyanate are mixed. Thus, the processability is not lowered in the case that (A) the aqueous polyol composition and (B) the aqueous polyisocyanate are mixed little by little.

The curing type polyurethane aqueous paint of the present invention may contain, in addition to the components described above, additives, such as a pigment, an ultraviolet absorber, an antioxidant, a light stabilizer, a fluorescent brightener, an anti-blocking agent, a leveling agent, a slip agent, and a viscosity modifier, which are generally contained in the paint for a golf ball, where necessary.

Next, the applying method of the curing type polyurethane aqueous paint used in the present invention will be described. The method of applying the curing type polyurethane aqueous paint is not limited, and includes a conventional method for the mixing type paint, for example, spray coating method or electrostatic coating method.

In the case of applying the paint with the air gun, (A) the aqueous polyol composition and (B) the aqueous polyisocyanate are fed with the respective pumps and continuously mixed in a constant ratio through the line mixer such as the static mixer located in the stream line just before the air gun, and the obtained mixture can be air-sprayed. Alternatively, (A) the aqueous polyol composition and (B) the aqueous polyisocyanate can be air-sprayed respectively with the spray gun having the device for controlling the mixing ratio thereof.

A manner in which the painting is performed by using the air gun is not limited, for example, and includes a manner shown in FIG. 1. FIG. 1 is a schematic diagram illustrating an exemplary painting manner using an air gun. The manner of painting includes supporting the golf ball 2 with the three prongs 3a to 3c, which are set up on a horizontally rotatable rotating element 1, rotating the rotating element 1 while supporting the golf ball 2, spacing a spray distance between the spray gun 4 and the golf ball 2, and spraying an atomized paint while moving the air gun 4 in up and down direction. In this case, the rotation speed of the rotating element 1 is preferably 300 rpm or more, and more preferably 400 rpm or more, and is preferably 800 rpm or less, and more preferably 700 rpm or less.

In the case of using an air gun, a spray distance, that is, a minimum distance between the spray nozzle of the air gun and the surface of a golf ball body, is preferably 5 cm or more, and more preferably 6 cm or more, and is preferably 15 cm or less, and more preferably 14 cm or less. If the spray distance is 5 cm or longer, the evenness of the film thickness of the obtained paint film can be enhanced. If the spray distance is 15 cm or less, it is possible to prevent the paint from spreading without being applied to the golf ball body.

A spraying air pressure of the air gun is preferably 0.01 MPa or more, and more preferably 0.05 MPa or more, and is preferably 0.30 MPa or less, and more preferably 0.25 MPa or less. If the spraying air pressure is 0.01 MPa or more, the paint can be fully atomized, thereby enhancing the evenness of the paint film. If the spraying air pressure is 0.30 MPa or less, a blast of air discharged from the air gun is not excessively strong, and it is possible to prevent the golf ball from falling from a supporter (rotating element) by air.

The air pressure for the air gun from the compressed air tank is preferably 0.01 MPa or more, more preferably 0.05 MPa or more, and is preferably 0.30 MPa or less, and more preferably 0.25 MPa or less. If the air pressure of the compressed air tank is 0.01 MPa or more, the paint can be fully atomized, thereby enhancing the evenness of the paint film. If the air pressure of the compressed air tank is 0.30 MPa or less, a blast of air discharged from the air gun is not excessively strong, and it is possible to prevent the golf ball from falling from the supporter (rotating element) by air.

The spraying air pressure of the air gun is an air pressure at the nozzle of the air gun, and the air pressure of the compressed air tank is a pressure of the air supplied to the air gun.

Further, in the case of using an air gun, painting time per one spraying is preferably 0.1 second or longer, and more preferably 0.5 second or longer, and is preferably 3 seconds or less, and more preferably 2.5 seconds or less. If the painting time per one spraying is 0.1 second or longer, a blast of air discharged from the air gun is not excessively strong, and it is possible to prevent the golf ball body from falling from the supporter (rotating element) by air. On the other hand, if the painting time is 3 seconds or less, a blast of air discharged from the air gun is not excessively weak, and the paint can be fully atomized, thereby enhancing the evenness of the paint film.

The curing type polyurethane aqueous paint applied to the golf ball body is dried at the temperature ranging from 30° C. to 70° C. for 1 hour to 24 hours to form a paint film. Since the golf ball body uses a thermoplastic material, drying temperature is preferably 40° C. or less. In the case of drying at the temperature of 40° C. or less, tack-free time is preferably within 6 hours, more preferably within 4 hours.

The thickness of the paint film after drying is preferably, without limitation, 4 μm or more, more preferably 5 μm or more, and is preferably 50 μm or less, more preferably 40 μm or less. If the thickness is less than 4 μm, the paint film is likely to wear off due to the continued use. If the thickness is more than 50 μm, the effect of the dimples is lowered, and thus the flying performance of the golf ball tends to be low. The paint film preferably has a single-layered structure. If the paint film has a single-layered structure, the process of applying the paint is simplified. In the present invention, the paint film shows the excellent property even if it has the single-layered structure. The paint film is preferably an outermost clear paint layer.

The golf ball of the present invention is a painted golf ball that comprises a golf ball body and a paint film, wherein the paint film is formed from the curing type polyurethane aqueous golf ball paint.

The golf ball body does not have no limitation on the structure, and may be a one-piece golf ball, a two-piece golf ball, a multi-piece golf ball including a three-piece-golf ball, or a wound golf ball. The present invention can be applied appropriately to any one of the above golf balls.

Examples of the cover material constituting the cover include, various resins such as an ionomer resin, a polyester resin, polyurethane resins like a thermoplastic urethane resin and a thermosetting urethane resin, and a polyamide resin; and various thermoplastic elastomers such as a thermoplastic polyamide elastomer having a trade name "Pebax (registered trademark) (e.g. "Pebax 2533")" commercially available from Arkema Inc., a thermoplastic polyester elastomer having a trade name "Hytrel (registered trademark) (e.g. "Hytrel 3548" and "Hytrel 4047")" commercially available from Du Pont-Toray Co., Ltd., a thermoplastic polyurethane elastomer having a trade name "Elastollan (registered trademark) (e.g. "Elastollan XNY97A")" available from BASF Japan Ltd, and thermoplastic polystyrene elastomers having a trade name "Rabalon (registered trademark)(e.g. "Rabalon T3221C")" and having a trade name "Primalloy" commercially available from Mitsubishi Chemical Corporation, and the like. These cover materials may be used solely or in combination of two or more types thereof.

The cover in the present invention may contain a pigment component such as a white pigment (for example, titanium oxide), a blue pigment, a red pigment, and the like, a specific gravity adjusting agent such as zinc oxide, calcium carbonate, barium sulfate, and the like, a dispersant, an antioxidant, an ultraviolet absorber, a light stabilizer, a fluorescent material or a fluorescent brightener, or the like, as long as they do not impair the performance of the cover.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

When molding a cover, the concave portions called "dimple" are usually formed on the surface. The total number of the dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them. After the cover is molded, the mold is opened and the golf ball body is taken out from the mold, and as necessary, the golf ball body is preferably subjected to surface treatments such as deburring, cleaning, and sandblast. If desired, a paint film or a mark may be formed.

Next, the core used for the wound golf ball, two-piece golf ball, multi-piece golf ball, and the one-piece golf ball body will be explained.

As the core or the one-piece golf ball body, a conventionally known rubber composition (hereinafter simply referred to as "core rubber composition" occasionally) may be employed, and they can be molded by, for example, heat-pressing a rubber composition containing a base rubber, a crosslinking initiator, and a co-crosslinking agent.

As the base rubber, typically preferred is the high cis-polybutadiene having cis-1,4-bond in a proportion of 40% or more, more preferably 70% or more, even more preferably 90% or more in view of its superior repulsion property. The co-crosslinking agent includes; for example, $\alpha,\beta$-unsaturated carboxylic acid having 3 to 8 carbon atoms or a metal salt thereof, more preferably a metal salt of acrylic acid or methacrylic acid. As the metal constituting the metal salt, for example, zinc, magnesium, calcium, aluminum and sodium may be used, and among them, zinc is preferred. The amount of the co-crosslinking agent to be used is preferably 20 parts or more, and is preferably 50 parts or less. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and is preferably 1.5 parts by mass or less, more preferably 1.0 parts by mass or less based on 100 parts by mass of the base rubber. The core rubber composition may further contain an organic sulfur compound. As the organic sulfur compound, a diphenyl disulfide or a derivative thereof may be preferably used. The amount of the organic sulfur compound is preferably 0.1 part by mass or more, more preferably 0.3 part by mass or more, and preferably 5.0 parts by mass or less, more preferably 3.0 parts by mass or less relative to 100 parts by mass of the base rubber.

The core rubber composition may further contain a gravity adjusting agent such as zinc oxide or barium sulfate, an antioxidant, or a colored powder in addition to the base rubber, the crosslinking initiator, the co-crosslinking agent and the organic sulfur compound. The conditions for press-molding the core rubber composition should be determined appropriately depending on the rubber composition. The press-molding is preferably carried out for 10 to 60 minutes at the temperature of 130° C. to 200° C. or the press-molding is preferably carried out in a two-step heating, for example, for 20 to 40 minutes at the temperature of 130° C. to 150° C., and continuously for 5 to 15 minutes at the temperature of 160° C. to 180° C.

In the case that the golf ball of the present invention is a multi-piece golf ball including a three-piece golf ball, the material for the intermediate layer disposed between the core and the cover includes a thermoplastic resin such as a polyurethane resin, an ionomer resin, a polyamide resin, and polyethylene; and a thermoplastic elastomer such as a polystyrene elastomer, a polyolefin elastomer, a polyurethane elastomer, a polyester elastomer; and a cured product of a rubber composition. Herein, examples of the ionomer resin include one prepared by neutralizing at least a part of carboxyl groups in a copolymer composed of ethylene and $\alpha,\beta$-unsaturated carboxylic acid with a metal ion, and one prepared by neutralizing at least a part of carboxyl groups in a terpolymer composed of ethylene, $\alpha,\beta$-unsaturated carboxylic acid and $\alpha,\beta$-unsaturated carboxylic acid ester with a metal ion. The intermediate layer may further contain a specific gravity adjusting agent such as barium sulfate, tungsten and the like, an antioxidant, and a pigment.

EXAMPLES

Hereinafter, the present invention will be described in detail by way of example. The present invention is not limited to examples described below. Various changes and modifications can be made without departing from the spirit and scope of the present invention.

[Evaluation Methods]
(1) Appearance of the Painted Golf Ball

The appearance of the painted golf ball was visually observed, and evaluated in accordance with the following evaluation criteria.

Evaluation criteria

E(Excellent): a state in which the surface was very smooth and very glossy.
G(Good): a state in which the surface was smooth and glossy.
F(Fair): a state in which the surface was slightly uneven, and was not so glossy.
P(Poor): a state in which the surface was substantially uneven, and was not glossy.

(2) Evenness of the Film Thickness

Figure 2:
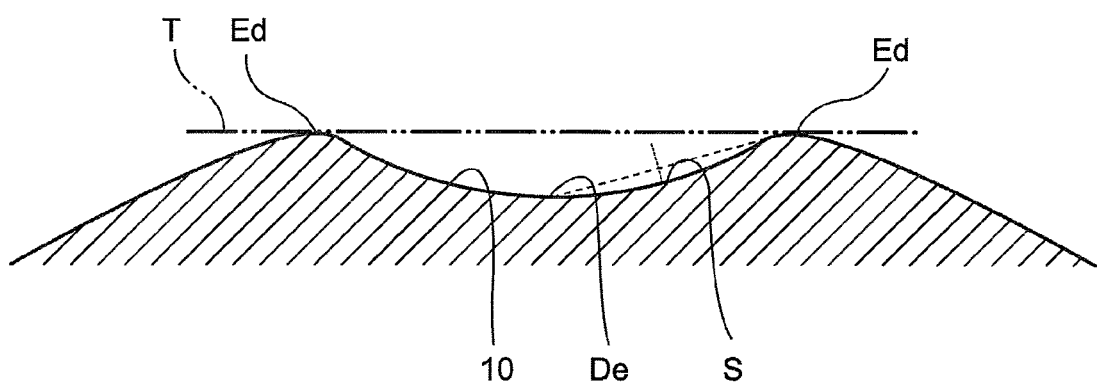
FIG. 2 is an expanded sectional view of the dimples formed on the surface of the golf ball body.

A part of the surface of the painted golf ball was cut out to form a test piece (about 7 square millimeters) for observing the film thickness of the paint film. As to 6 dimples, the thicknesses of the paint film at the bottom and the edge, and a slope surface of each dimple were measured by using a microscope to obtain the respective averages, and the evaluation was made in accordance with the following evaluation criteria. Measuring points of the bottom and the edge, and the slope surface of each dimple will be described with reference to FIG. 2. FIG. 2 is a schematic diagram illustrating a cross-section including the bottom De of a dimple 10 and the center of a golf ball 2. The bottom De of the dimple is the deepest portion of the dimple 10. The edges Ed are tangent points at which the dimple 10 is tangent to a tangent line T which is drawn tangent to the farthest opposite ends of the dimple 10. A measurement point S on the slope surface is a point at which the slope surface of the dimple intersects the perpendicular line extending toward the dimple 10 from the center point of the straight line connecting between the bottom De and the edge Ed of the dimple.

Evaluation Criteria

The average of the film thicknesses at the bottoms of the dimples, the average of the film thicknesses at the edges of the dimples, and the average of the film thicknesses at the slope surfaces of the dimples are represented by x, y, and z, respectively.

E(Excellent): $|x-y| \leq 1.5$ μm and $|y-z| \leq 1.5$ μm and $|z-x| \leq 1.5$ μm
G(Good): $|x-y| \leq 3$ μm and $|y-z| \leq 3$ μm and $|z-x| \leq 3$ μm
P(Poor): $|x-y| > 3$ μm or $|y-z| > 3$ μm or $|z-x| > 3$ μm (3) Adhesion of Paint Film A metal-headed driver (W#1) was installed on a swing robot manufactured by True Temper Co. Each painted golf ball was repeatedly hit at a head speed of 45 m/s 50 times, and thereafter the peeling state of the paint film was observed, and the evaluation was made in accordance with the following evaluation criteria.

Evaluation Criteria

E(Excellent): The paint film did not peel off at all.
G(Good): An area in which the paint film peeled off was 1% or less with respect to the total area of the paint film.
F(Fair): An area in which the paint film peeled off was more than 1% and 5% or less with respect to the total area of the paint film.
P(Poor): An area in which the paint film peeled off was more than 5% with respect to the total area of the paint film.

(4) Elongation of the Aqueous Urethane Resin

An aqueous polyurethane resin was used to produce a film having a film thickness of 500 μm. Drying was performed under the condition that preliminary drying was performed at room temperature for 15 hours, and final drying was performed at 80° C. for 6 hours, and at 120° C. for 20 minutes. Subsequently, the obtained film was stamped out to form a test piece, and the elongation was measured with a Tensilon universal material testing Instrument. The measurement was performed under the condition that the length of the test piece was 30 mm and the crosshead speed was 200 mm/min.

(5) Glass Transition Temperature

The glass transition temperature of the aqueous acrylic polyol was measured by using a differential scanning calorimeter (DSC) ("Q200" available from TA Instruments Inc.). The measurement was performed under the condition of the measurement temperature range:-50° C. to 200° C. and the temperature increase rate: 20° C./min.

The glass transition temperature of the aqueous polyurethane resin was measured by using a dynamic viscoelasticity measuring apparatus (Rheogel-E4000 available from UBM Co., Ltd.). The measurement was performed under the conditions of the oscillation frequency: 10 Hz, the measurement temperature range: −100° C. to 200° C., and the temperature increase rate: 2° C./min. A film produced by using an aqueous polyurethane resin was used as a test sample. The drying was performed under the condition that preliminary drying was performed at room temperature for 15 hours, and final drying was performed at 80° C. for 6 hours and at 120° C. for 20 minutes.

(6) Non-Volatile Content

Approximately 2 g of a sample was put on an aluminum plate and was forced to be dried at 150° C. for 1 hour, and the non-volatile content was determined, based on the mass before drying and the mass after drying.

(7) Viscosity

The viscosity of the curing type polyurethane aqueous paint for a golf ball was measured by using a single cylinder rotational viscometer ("Viscotester VT-04F" available from Riontech Co., Ltd). The measurement was performed by using a rotor No. 3, and the rotation speed of the rotor was 62.5 $min^{-1}$, and the measurement temperature was 25° C. The viscosity of the curing type polyurethane aqueous paint according to the present invention was measured immediately after (A) the aqueous polyol composition and (B) the aqueous polyisocyanate were mixed.

(8) Drying Time

After the paint was applied to the golf ball, the golf ball was kept in the container kept at 40° C. Every predetermined time, the drying state of the golf ball was confirmed by touching the golf ball with a finger. The time when there is no shape of the fingertip or finger print left on the paint film is determined as tack free time (drying time), and ranked into the following evaluation criteria.

E (Excellent): Drying time is less than 4 hours.
G(Good): Drying time is 4 hours or more and less than 6 hours.
F(Fair): Drying time is 6 hours or more and less than 8 hours.
P(Poor): Drying time is 8 hours or more.

[Production of the Two-Piece Golf Ball]

(1) Preparation of Solid Core

The core rubber composition shown in Table 1 was kneaded and heat-pressed with upper and lower molds each having a spherical cavity at the heating condition of 160° C. for 13 minutes to obtain the solid core in a spherical shape having a diameter of 39.3 mm.

TABLE 1

| Core formulation | Amount (parts) |
| --- | --- |
| Polybutadiene rubber | 100 |
| Zinc oxide | 5.6 |
| Zinc acrylate | 22.0 |
| Calcium carbonate | 21.0 |
| Dicumyl peroxide | 1.85 |

Notes on Table 1:
Polybutadiene rubber: BR-51 (cis content: 96%) available from JSR.
Zinc oxide: "Ginrei R" produced by Toho-Zinc.
Zinc acrylate: "ZNDA-90S" produced by NIHON JYORYU KOGYO.
Calcium carbonate: "BF-300" produced by SHIRAISHI CALCIUM KAISHA, LTD
Dicumyl peroxide: "Percumyl D" produced by NOF Corporation.

(2) Preparation of the Cover Material

The materials shown in Table 2 were mixed using a twin-screw kneading extruder to obtain the cover composition in the form of pellet. The extrusion was conducted in the following conditions: screw diameter=45 mm, screw revolutions=200 rpm, and screw L/D=35. The cover composition was heated to from 200° C. to 260° C. at the die position of the extruder.

TABLE 2

| Cover material | Amount (parts) |
| --- | --- |
| Himilan 1605 | 40 |
| Himilan 1706 | 30 |
| Himilan 1707 | 30 |
| Titanium oxide | 2 |

Notes on Table 2:
HIMILAN 1605: an ionomer resin of a sodium ion-neutralized ethylene-methacrylic acid copolymer, available from MITSUI-DUPONT POLYCHEMICAL.
HIMILAN 1706: an ionomer resin of a zinc ion-neutralized ethylene-methacrylic acid copolymer, available from MITSUI-DUPONT POLYCHEMICAL.
HIMILAN 1707: an ionomer resin of a sodium ion-neutralized ethylene-methacrylic acid copolymer, available from MITSUI-DUPONT POLYCHEMICAL.

(3) Preparation of the Golf Ball Body

The cover composition thus prepared was directly injection-molded onto the core to form the cover, thereby obtaining the two-piece golf ball body having a diameter of 42.7 mm. The upper and lower molds for forming the cover have a spherical cavity with pimples. The part of the pimples can serve as a hold pin which is retractable. When forming the golf ball body, the hold pins were protruded to hold the core, and the resin heated at 210° C. was charged into the mold held under the pressure of 80 tons for 0.3 seconds. After cooling for 30 seconds, the molds were opened and then the golf ball body was discharged. Dimples were formed on the surface of the golf ball.

(4) Formation of Paint Film (a-1) The aqueous acrylic polyol, (a-2) the aqueous urethane polyol, and (a-3) the aqueous polyurethane resin were blended to prepare (A) the aqueous polyol composition. To (A) the obtained aqueous polyol composition, (B) the aqueous polyisocyanate was slowly added while mixing them to prepare the curing type polyurethane aqueous paints having formulations shown in Tables 3 and 4. The surfaces of the obtained golf ball bodies were subjected to the sandblast treatment, and the two-component curing type polyurethane aqueous paints were applied to the golf ball bodies with the air-gun, and the paints were dried in the oven heated at 40° C. to form the painted golf balls having the paint film with the thickness of 10 μm. The application of the paint was conducted immediately after (A) the aqueous polyol composition and (B) the aqueous polyisocyanate were mixed. The appearances of the resultant painted golf balls, the evenness and the adhesion of the formed paint film were evaluated and the results thereof were also shown in Tables 3 and 4.

TABLE 3

| | | | | Painted golf ball | | | | | | | | |
| --- | --- | --- | --- | --- | --- | --- | --- | --- | --- | --- | --- | --- |
| | | | | 1 | 2 | 3 | 4 | 5 | 6 | 7 | 8 | 9 |
| Paint | Formulation | (A) Aqueous polyol composition | (a-1) Aqueous acrylic polyol | 20 | 35 | 45 | 35 | 35 | 35 | 35 | 35 | 63 |
| | | | (a-2) Aqueous urethane polyol | 30 | 15 | 5 | 15 | 15 | 15 | 15 | 15 | 27 |
| | | | (a-3) Aqueous polyurethane resin | 50 | 50 | 50 | 50 | 50 | 50 | 50 | 50 | 10 |
| | | (B) Aqueous polyisocyanate | (b-1) HDI derivative | 69 | 50.25 | 37.5 | 42 | 83.25 | 59.4 | 38 | 32 | 90 |
| | | | (b-2) IPDI derivative | 23 | 16.75 | 12.5 | 14 | 27.75 | 0.6 | 38 | 48 | 30 |
| | Non-volatile of (A) aqueous polyol composition (mass %) | | | 50.6 | 44.3 | 40.1 | 44.3 | 44.3 | 44.3 | 44.3 | 44.3 | 55.7 |
| | Content of high boiling point solvent having a boiling point of 150° C. or more (mass %) | | | 5.0 | 5.0 | 5.0 | 5.0 | 5.0 | 5.0 | 5.0 | 5.0 | 5.0 |
| | Content of high boiling point solvent having a boiling point of 180° C. or more (mass %) | | | 0.5 | 2.0 | 3.0 | 2.0 | 2.0 | 2.0 | 2.0 | 2.0 | 2.0 |
| | Mass ratio of (a-1)/(a-2) in (A) Aqueous polyol composition | | | 40/60 | 70/30 | 90/10 | 70/30 | 70/30 | 70/30 | 70/30 | 70/30 | 70/30 |
| | Mass ratio of (b-1)/(b-2) in (B) Aqueous polyisocyanate | | | 75/25 | 75/25 | 75/25 | 75/25 | 75/25 | 99/1 | 50/50 | 40/60 | 75/25 |
| | Molar ratio (NCO/OH) of NCO of (B) aqueous polyisocyanate/OH of (A) aqueous polyol composition | | | 1.5 | 1.5 | 1.5 | 1.25 | 2.5 | 1.5 | 1.5 | 1.5 | 1.5 |
| | Non-volatile (mass %) | | | 27 | 32 | 35 | 33 | 40 | 32 | 32 | 32 | 40 |
| | Viscosity (mPa · s) | | | 130 | 155 | 160 | 145 | 175 | 155 | 155 | 155 | 170.0 |
| Property of Painted Golf ball | Thickness of Paint film (μm) | | | 10.1 | 10.3 | 9.8 | 10.3 | 10.1 | 9.8 | 9.9 | 10.1 | 10.1 |
| | Appearance of golf ball | | | F | G | E | G | G | G | G | F | G |
| | Evenness of film thickness | | | G | G | G | G | G | G | G | G | G |
| | Adhesion of paint film | | | E | G | G | G | G | G | G | F | P |
| | Drying time | | | G | G | G | G | G | G | G | G | G |

TABLE 4

|  |  |  |  | Painted golf ball | | | | | | | | |
|---|---|---|---|---|---|---|---|---|---|---|---|---|
|  |  |  |  | 10 | 11 | 12 | 13 | 14 | 15 | 16 | 17 | 18 |
| Paint | Formulation | (A) Aqueous polyol composition | (a-1) Aqueous acrylic polyol | 35 | 33 | 35 | 35 | 35 | 35 | 35 | 35 | 35 |
|  |  |  | (a-2) Aqueous urethane polyol | 15 | 15 | 15 | 15 | 15 | 15 | 15 | 15 | 15 |
|  |  |  | (a-3) Aqueous polyurethane resin | 50 | 50 | 50 | 50 | 50 | 50 | 50 | 50 | 50 |
|  |  | (B) Aqueous polyisocyanate | (b-1) HDI derivative | 36.75 | 100.5 | 50.25 | 50.25 | 50.25 | 50.25 | 50.25 | 50.25 | 50.25 |
|  |  |  | (b-2) IPDI derivative | 12.25 | 33.5 | 16.75 | 16.75 | 16.75 | 16.75 | 16.75 | 16.75 | 16.75 |
|  | Non-volatile of (A) aqueous polyol composition (mass %) | | | 44.3 | 44.3 | 44.3 | 44.3 | 44.3 | 44.3 | 44.3 | 44.3 | 44.3 |
|  | Content of high boiling point solvent having a boiling point of 150° C. or more (mass %) | | | 5.0 | 5.0 | 0.5 | 0.0 | 10.5 | 15.0 | 2.5 | 7.5 | 10.0 |
|  | Content of high boiling point solvent having a boiling point of 180° C. or more (mass %) | | | 2.0 | 2.0 | 0.1 | 0.0 | 5.0 | 5.0 | 1.0 | 2.0 | 2.0 |
|  | Mass ratio of (a-1)/(a-2) in (A) Aqueous polyol composition | | | 70/30 | 70/30 | 70/30 | 70/30 | 70/30 | 70/30 | 70/30 | 70/30 | 70/30 |
|  | Mass ratio of (b-1)/(b-2) in (B) Aqueous polyisocyanate | | | 75/25 | 75/25 | 75/25 | 75/25 | 75/25 | 75/25 | 75/25 | 75/25 | 75/25 |
|  | Molar ratio (NCO/OH) of NCO of (B) aqueous polyisocyanate/OH of (A) aqueous polyol composition | | | 1.1 | 3 | 1.5 | 1.5 | 1.5 | 1.5 | 1.5 | 1.5 | 1.5 |
|  | Non-volatile (mass %) | | | 30 | 42 | 32 | 32 | 32 | 32 | 32 | 32 | 32 |
|  | Viscosity (mPa · s) | | | 140 | 180 | 155 | 155 | 155 | 155 | 155 | 155 | 155 |
| Property of Painted Golf ball | Thickness of Paint film (μm) | | | 10.2 | 9.7 | 10.2 | 10.2 | 10.3 | 10.4 | 10.2 | 10.1 | 10.3 |
|  | Appearance of golf ball | | | P | P | G | P | G | G | G | G | G |
|  | Evenness of film thickness | | | G | G | G | G | G | E | G | G | G |
|  | Adhesion of paint film | | | G | P | G | G | G | G | G | G | G |
|  | Drying time | | | G | G | E | E | P | P | G | G | F |

Notes on Tables 3 and 4:
Formulation: mass parts (based on non-volatiles)
High boiling point solvent having a boiling point of 150° C. or more: methoxybutyl acetate
High boiling point solvent having a boiling point of 180° C. or more: texanol (2,2,4-trimethyl-1,3-pentandiol monoisobutyrate)
Aqueous acrylic polyol: an aqueous acrylic polyol (hydroxyl value: 108 mgKOH/g, average number of hydroxyl group: 28.8, glass transition temperature: 46° C., non-volatile: 46 mass %, weight average molecular weight:15,000) available from SHINTO PAINT
Aqueous urethane polyol: "FLEXOREZ(registered trademark)) UD-350W" (hydroxyl value: 325 mgKOH/g, average number of hydroxyl group: 2.3, non-volatile: 88 mass %, weight average molecular weight 400) available from King Industries, Inc.
Aqueous polyurethane resin: "SUPERFLEX (registered trademark) 300" (glass transition temperature: −40° C., Non-volatile content: 30 mass %, Elongation: 1,500%) available from Dai-ichi Kogyo Seiyaku Co., Ltd
HDI derivative: "Bayhydur (registered trademark) 305" (NCO content: 16.2 mass %, non-solvent) available from Sumika Bayer Urethane Co., Ltd.
IPDI derivative: "Bayhydur (registered trademark) 401-70" (NCO content: 9.4 mass %, non-volatile: 70 mass %) available from Sumika Bayer Urethane Co., Ltd.

Painted golf balls No. 1 to 9, 12, 16 to 18 are the cases using a curing type polyurethane aqueous golf ball paint, comprising (A) an aqueous polyol composition and (B) an aqueous polyisocyanate, wherein (A) the aqueous polyol composition contains (a-1) an aqueous acrylic polyol, (a-2) an aqueous urethane polyol and (a-3) an aqueous polyurethane resin; a molar ratio (NCO/OH) of an isocyanate group of (B) the aqueous polyisocyanate to a hydroxyl group of (A) the aqueous polyol composition ranges from 1.25 to 2.50; and a content of a high boiling point solvent having a boiling point of 150° C. or more in the aqueous golf ball paint is more than 0 mass % and 10 mass % or less. The results indicate that the thickness of the paint film is even and the golf balls have a surface gloss. Also, the adhesion of the paint film to the golf ball body is excellent.

The present invention is useful as a golf ball aqueous paint and the golf ball. This application is based on Japanese Patent applications No. 2009-251329 filed on Oct, 30 2009, the contents of which are hereby incorporated by reference.

The invention claimed is:

1. A painted golf ball comprising a golf ball body and a paint film formed on the golf ball body, wherein the paint film is formed from a curing type polyurethane aqueous golf ball paint, comprising (A) an aqueous polyol composition and (B) an aqueous polyisocyanate, wherein (A) the aqueous polyol composition contains (a-1) an aqueous acrylic polyol, (a-2) an aqueous urethane polyol and (a-3) an aqueous polyurethane resin; a molar ratio (NCO/OH) of an isocyanate group of (B) the aqueous polyisocyanate to a hydroxyl group of (A) the aqueous polyol composition ranges from 1.25 to 2.50; and a content of a high boiling point solvent having a boiling point of 150° C. or more in the aqueous golf ball paint is more than 0 mass % and 10 mass % or less.

2. The painted golf ball according to claim 1, wherein the content of the high boiling point solvent having a boiling point of 180° C. or more is more than 0 mass % and 5 mass % or less.

3. The painted golf ball according to claim 1, wherein a content of (a-3) the aqueous polyurethane resin in (A) the aqueous polyol composition ranges from 20 mass % to 80 mass %.

4. The painted golf ball according to claim 1, wherein (a-1) the aqueous acrylic polyol has a hydroxyl value ranging from 50 mgKOH/g to 150 mgKOH/g.

5. The painted golf ball according to claim 1, wherein a blending ratio (a-1)/(a-2) (total: 100 mass %) of (a-1) the aqueous acrylic polyol to (a-2) the aqueous urethane polyol in (A) the aqueous polyol composition is 40 mass % to 90 mass %/60 mass % to 10 mass %.

6. The painted golf ball according to claim 1, wherein (B) the aqueous polyisocyanate contains (b-1) hexamethylene diisocyanate and/or a derivative thereof, and (b-2) isophorone diisocyanate and/or a derivative thereof.

7. The painted golf ball according to claim 1, wherein a blending ratio (b-1)/(b-2) (total: 100 mass %) of (b-1) hexamethylene diisocyanate and/or the derivative thereof to (b-2) isophorone diisocyanate and/or the derivative thereof is 50 mass % to 99 mass % /50 mass % to 1 mass %.

8. The painted golf ball according to claim 1, wherein (a-1) the aqueous acrylic polyol has a glass transition temperature ranging from 20° C. to 60° C.

9. The painted golf ball according to claim 1, wherein (a-1) the aqueous acrylic polyol has a weight average molecular weight ranging from 3,000 to 50,000.

10. The painted golf ball according to claim 1, wherein an average number of hydroxyl groups of (a-1) the aqueous acrylic polyol ranges from 5 to 100.

11. The painted golf ball according to claim 1, wherein (a-2) the aqueous urethane polyol has a hydroxyl value ranging from 50 mg KOH/g to 500 mg KOH/g.

12. The painted golf ball according to claim 1, wherein (a-2) the aqueous urethane polyol has a weight average molecular weight ranging from 200 to 50,000.

13. The painted golf ball according to claim 1, wherein an average number of hydroxyl groups of (a-2) the aqueous urethane polyol ranges from 1.0 to 50.

14. The painted golf ball according to claim 1, wherein (a-3) the aqueous polyurethane resin has a hydroxyl value of 5 mg KOH/g or less.

15. The painted golf ball according to claim 1, wherein (a-3) the aqueous polyurethane resin has a glass transition temperature of 20° C. or less.

16. The painted golf ball according to claim 1, wherein (a-3) the aqueous polyurethane resin has an elongation ranging from 100% to 2,000%.

17. The painted golf ball according to claim 1, wherein (a-3) the aqueous polyurethane resin has a volume average particle diameter ranging from 50 nm to 300 nm.

18. The painted golf ball according to claim 1, wherein (A) the aqueous polyol composition has a non-volatile content ranging from 20 mass % to 85 mass %.

19. The painted golf ball according to claim 1, wherein the curing type polyurethane aqueous golf ball paint has a viscosity ranging from 50 mPa·s to 350 mPa·s.

* * * * *